United States Patent [19]
Kroulik

[11] Patent Number: 6,111,194
[45] Date of Patent: Aug. 29, 2000

[54] ELECTRICAL AND/OR FLUID POWER TRANSMITTING ASSEMBLY IN A MANIPULATIVE ROBOT

[75] Inventor: Erwin K. Kroulik, Edmore, Mich.

[73] Assignee: Flex-Cable, Inc., Morley, Mich.

[21] Appl. No.: 08/936,060

[22] Filed: Sep. 23, 1997

[51] Int. Cl.[7] .................................................. F16L 11/12
[52] U.S. Cl. ..................... 174/47; 174/70 A; 174/120 R; 174/135; 138/128
[58] Field of Search .................... 174/47, 113 R, 174/70 A, 41, 120 R, 136, 135; 138/128, 156; 248/68.1

[56] References Cited

U.S. PATENT DOCUMENTS

| | | | |
|---|---|---|---|
| Re. 35,527 | 6/1997 | Martucci .................................. | 174/47 |
| 3,080,892 | 3/1963 | Plummer ................................. | 138/128 |
| 3,197,830 | 8/1965 | Hoadley ................................. | 24/16 PB |
| 3,441,655 | 4/1969 | Turner .................................... | 174/47 |
| 3,555,170 | 1/1971 | Petzetakis .............................. | 174/47 |
| 4,922,584 | 5/1990 | Funakawa et al. ..................... | 24/381 |
| 5,023,394 | 6/1991 | Watanabe et al. ..................... | 174/35 R |
| 5,269,377 | 12/1993 | Martin .................................... | 166/385 |
| 5,391,838 | 2/1995 | Plummer, III .......................... | 174/36 |
| 5,745,960 | 5/1998 | Dishner et al. ........................ | 24/381 |
| 5,901,756 | 5/1999 | Goodrich ............................... | 138/167 |

FOREIGN PATENT DOCUMENTS 2272926  1/1994  United Kingdom ................... 174/47

*Primary Examiner*—Dean A. Reichard
*Assistant Examiner*—Dhiru R Patel
*Attorney, Agent, or Firm*—Taylor & Associates, P.C.

[57] ABSTRACT

A power transmitting elongate assembly transmits electrical or fluid power in a manipulative robot. At least one power transmitting elongate element has a longitudinal axis. Each elongate element is configured as an electrical cable or a fluid hose. A protective sleeve is wrapped completely around the at least one elongate element. The protective sleeve has a length and two opposite sides. Each side is disposed substantially parallel to the longitudinal axis. At least one fastener couples the protective sleeve to the at least one elongate element. Each fastener is wrapped around and/or attached to the protective sleeve. Each fastener includes two interconnecting components which interconnect with each other.

11 Claims, 3 Drawing Sheets

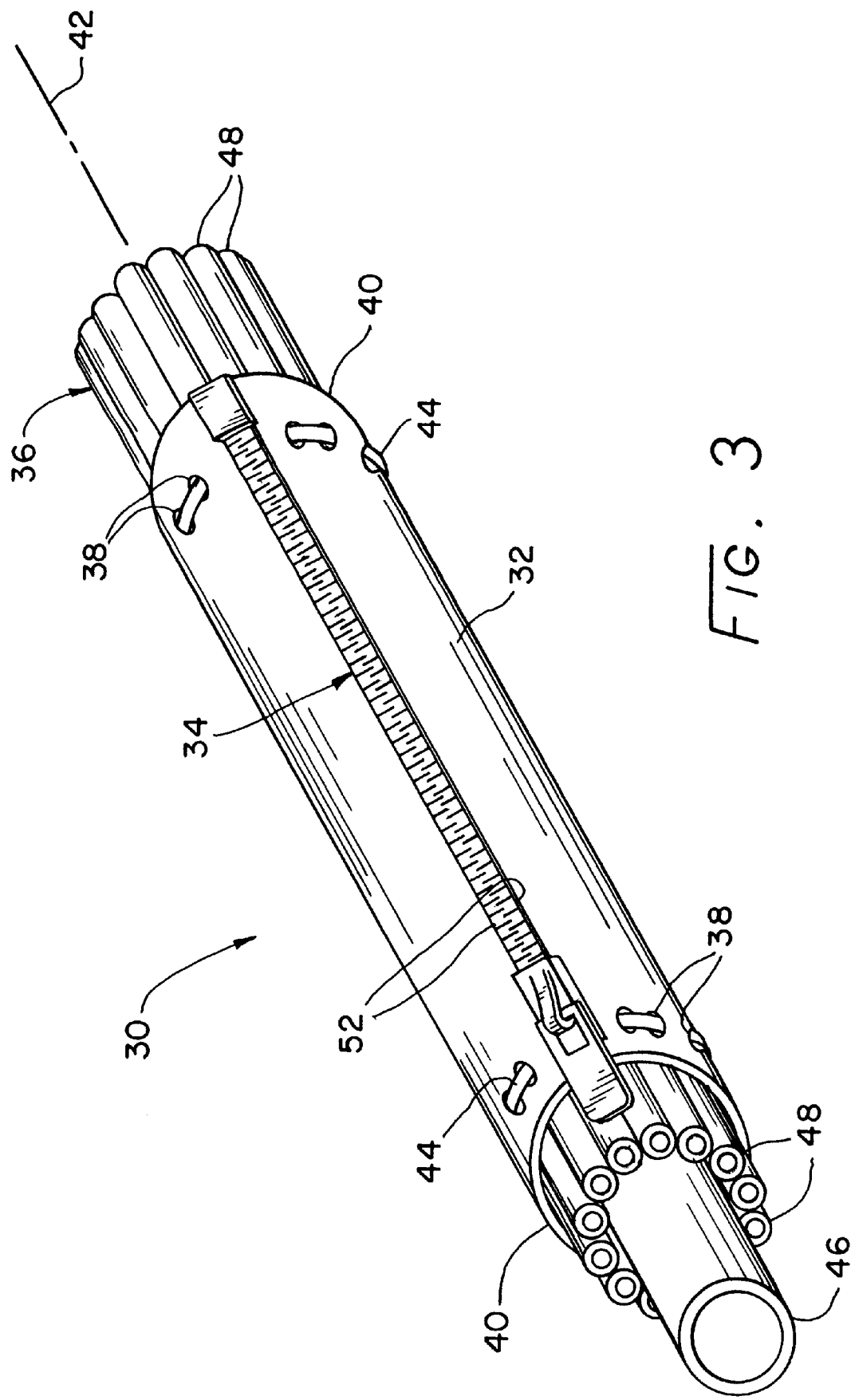

ELECTRICAL AND/OR FLUID POWER TRANSMITTING ASSEMBLY IN A MANIPULATIVE ROBOT

BACKGROUND OF THE INVENTION

1. Field of the Invention

The present invention relates to manipulative robots, and, more particularly, to electrical cables and/or fluid hoses used to transmit electrical and/or fluid power in a manipulative robot.

2. Description of the Related Art

A manipulative robot typically includes multiple mechanical components which move relative to each other and to a stationary structure (such as a floor) to which the robot is mounted. Such a manipulative robot also may include a movable arm which is attached to a body and carries one or more tools, positioning jaws, sensors, etc. For example, the robot arm may carry a Tugesten Insert Gas (TIG) welder which welds under the presence of an inert gas. It is thus necessary to provide both electrical power and the inert gas to the end of the robot arm for the TIG welding operation. Moreover, it may be desirable to transport cooling fluid through the welding tooling at the end of the robot arm to prevent the tooling from rising above a certain temperature.

It is known to provide power transmitting elongate elements for the purpose of transmitting electrical and/or fluid power to the end of a robot arm, as necessary. The elongate elements may be in the form of electrical cables and/or fluid hoses which are attached to the outside of the body and/or arm of the manipulative robot. The electrical cables and/or fluid hoses are usually carried by rings and/or clamps which are mounted on the body and/or arm of the robot. Relative movement between the rings or clamps and the electrical cables and/or fluid hoses may occur during movement of the manipulative robot. Moreover, relative movement may occur between the electrical cables and/or fluid hoses and the floor to which the robot is mounted. The relative movement between the electrical cables and/or fluid hoses and some other physical structure usually results in wear of the electrical cables and/or fluid hoses. Such wear may in turn result in electrical shorts and/or fluid leaks, which obviously are not desirable.

What is needed in the art is an assembly that adds a higher level of protection to the particularly exposed areas of an electrical cable or fluid hose. Also needed is a device that protects the areas that have already become worn or damaged on an electrical cable or fluid hose.

SUMMARY OF THE INVENTION

The present invention provides a device that adds a higher level of protection to the particularly exposed areas of an electrical cable or fluid hose. The device also protects the areas that have already become worn or damaged on an electrical cable or fluid hose.

The invention comprises, in one form thereof, a power transmitting elongate assembly for transmitting electrical or fluid power in a manipulative robot. At least one power transmitting elongate element has a longitudinal axis. Each elongate element is configured as an electrical cable or a fluid hose. A protective sleeve is wrapped completely around the at least one elongate element. The protective sleeve has a length and two opposite sides. Each side is disposed substantially parallel to the longitudinal axis. At least one fastener couples the protective sleeve to the at least one elongate element. Each fastener is wrapped around and/or attached to the protective sleeve. Each fastener includes two interconnecting components which interconnect with each other.

An advantage of the present invention is that the protective sleeve inhibits physical damage to the electrical cables and/or fluid hoses, thereby inhibiting electrical shorts and fluid leaks in the electrical cables and/or fluid hoses.

Another advantage of the present invention is that the protective sleeve can be easily and quickly installed on the electrical cable(s) and/or fluid hose(s), resulting in lower labor costs.

Yet another advantage is that different outer diameters of the electrical cable(s) and/or fluid hose(s) can be accommodated by the protective sleeve.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a fragmentary, perspective view of another embodiment of a power transmitting elongate assembly of the present invention.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
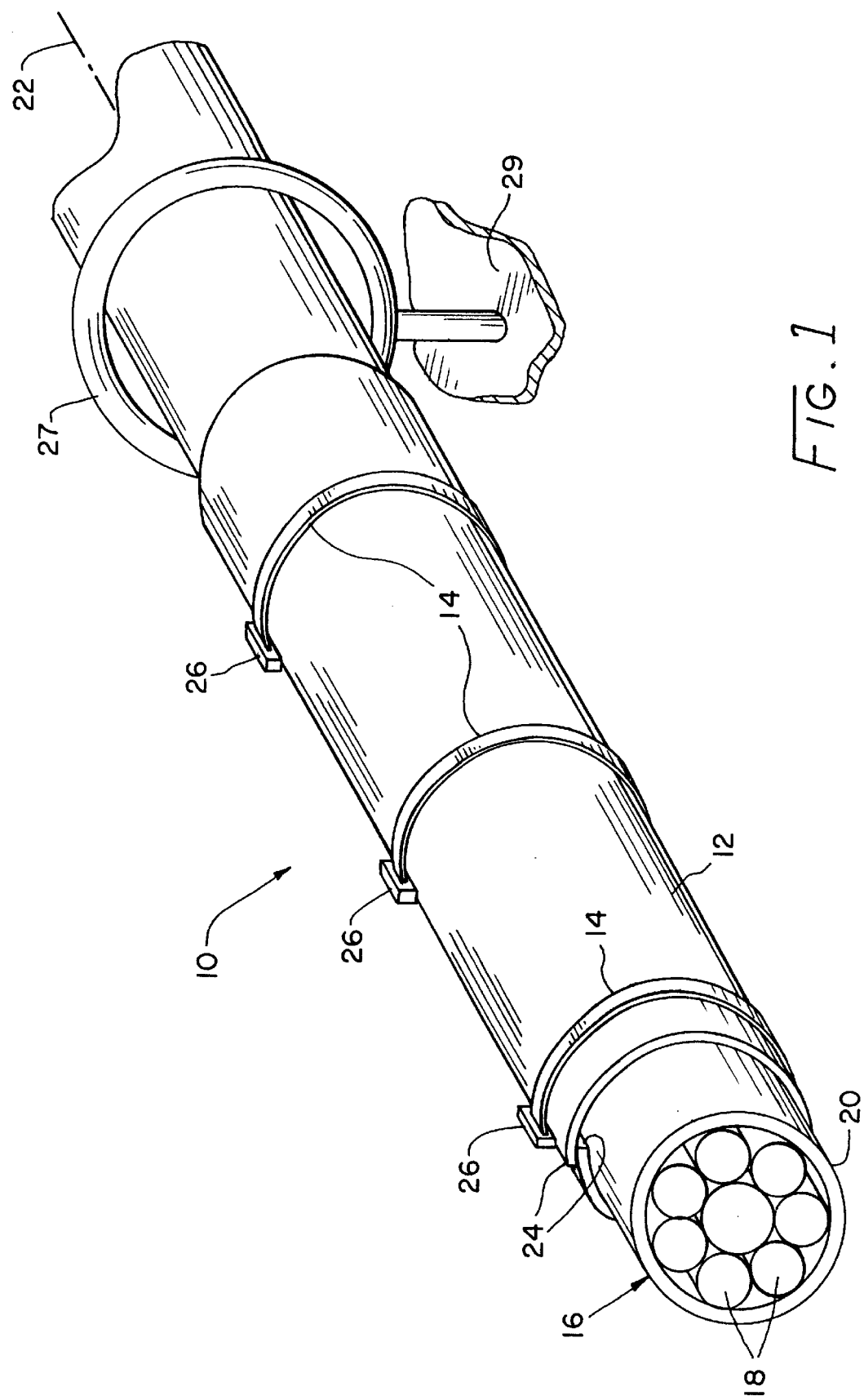
FIG. 1 is a fragmentary, perspective view of one embodiment of a power transmitting elongate assembly of the present invention.
Figure 2:
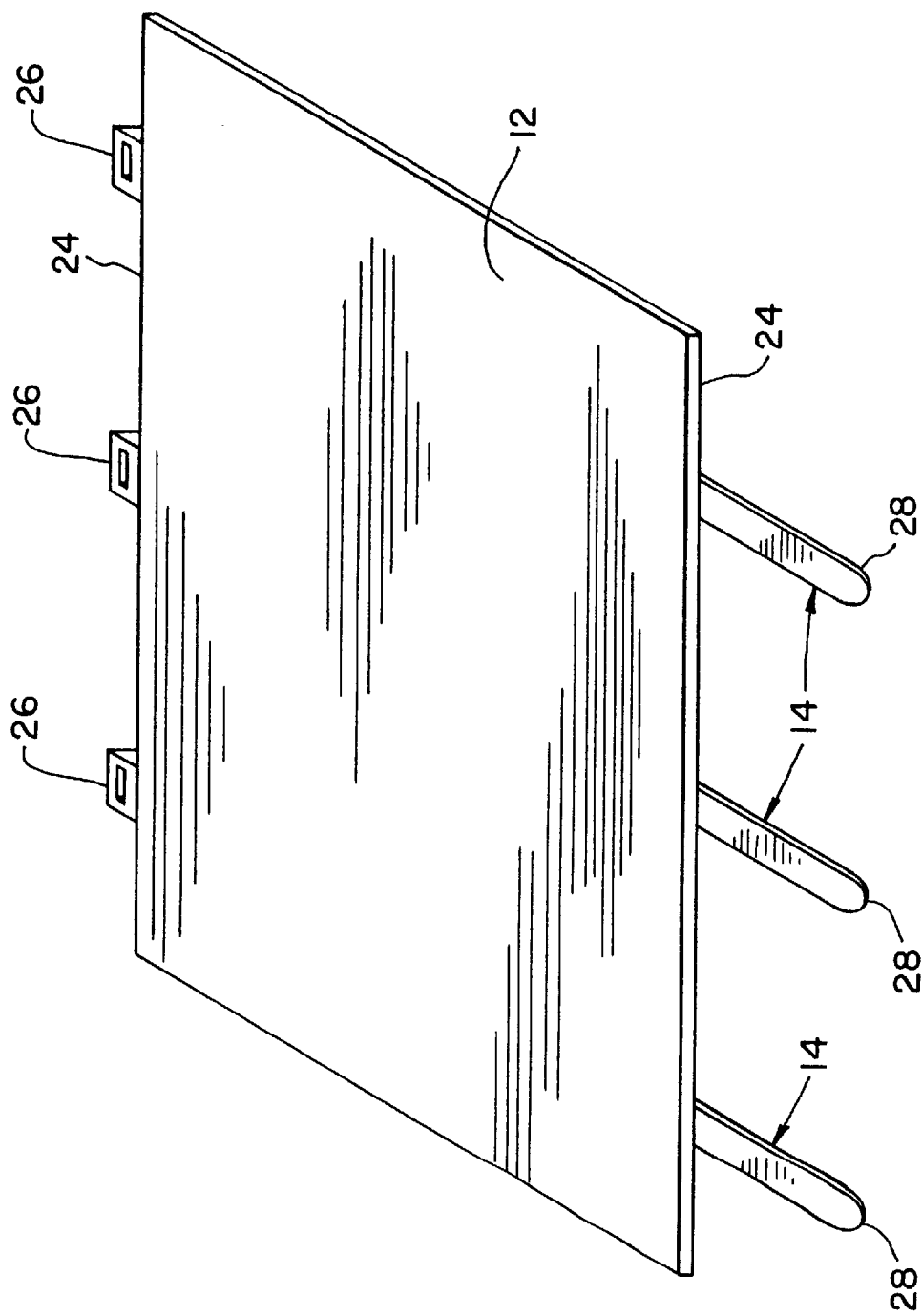
FIG. 2 is a perspective view of the protective sleeve and fasteners of FIG. 1.

Referring now to the drawings and particularly to FIGS. 1 and 2, there is shown an embodiment of a power transmitting elongate assembly 10 of the present invention, including a protective sleeve 12 secured by a plurality of fasteners 14 to a power transmitting elongate element.

A power transmitting elongate element transmits electrical and/or fluid power within a manipulative robot. In the embodiment shown, the elongate element is configured, e.g., as an electrical cable 16 for transmitting electrical power to a welder located at the end of an arm in a manipulative robot. Electrical cable 16 includes multiple strands or conductors 18 encased by electrical insulation 20. Electrical cable 16 also has a longitudinal axis 22.

The elongate element may also be configured, e.g., as a fluid hose to transmit cooling fluid through a tool located at the end of an arm in a manipulative robot; and/or as a pneumatic or hydraulic hose to transmit fluid power to a tool located at the end of an arm in a manipulative robot. Moreover, rather than being configured as a single elongate element as shown in FIGS. 1 and 2, the elongate element may be configured to include a plurality of electrical cables and/or fluid hoses.

As described above, and as will be appreciated by those skilled in the art, a manipulative robot includes multiple mechanical components which move relative to each other and to a stationary structure to which the robot is mounted. The electrical cables and/or fluid hoses are typically carried by rings or clamps which are mounted on the body and/or arm of the robot. Some relative movement between the rings or clamps and the electrical cables and/or fluid hoses may occur, leading to the possibility of wear of the electrical cables and/or fluid hoses. Such wear may in turn result in electrical shorts and/or fluid leaks, which are obviously not desirable.

Protective sleeve 12 is completely wrapped around electrical cable 16 at any desired location along the length of electrical cable 16. Protective sleeve 12 may have any desired length and thus may cover any desired portion of electrical cable 16. Protective sleeve 12 also includes two opposite sides 24 disposed substantially parallel to longitudinal axis 22. Protective sleeve 12 is preferably made from leather or an aramid fiber composite (e.g., Kevlar (TM)), although it is to be understood that protective sleeve 12 can be formed of virtually any electrically non-conductive, non-absorbent or non-permeable material.

A plurality of fasteners 14 couple protective sleeve 12 to electrical cable 16. Each fastener 14 includes two interconnecting components 26, 28 which interconnect with each other and secure protective sleeve 12 to electrical cable 16. In the embodiment shown in FIGS. 1 and 2, each fastener 14 is a tie strap having one interconnecting component 26 in the form of a one-way catch and another interconnecting component 28 in the form of a strap end. Each fastener 14 may be wrapped around and/or attached to protective sleeve 12, such that each fastener 14 is engaged and/or integral with protective sleeve 12. For example, each fastener 14 can be formed integral with protective sleeve 12; attached to protective sleeve 12 (such as by gluing or sewing); or merely wrapped around and engaged with protective sleeve 12.

In the embodiment shown in FIGS. 1 and 2, each tie wrap 14 is a continuous piece which is wrapped around protective sleeve 12. However, each fastener 14 may also be configured as a two piece fastener, with each piece attached to a respective side of protective sleeve 12 and having a respective interconnecting component 26, 28. Moreover, in the embodiment shown in FIGS. 1 and 2, each fastener 14 is configured as a tie strap as indicated above. Each tie strap 14 may be configured as a non-releasable tie strap (as shown), or as a releasable tie strap (not shown) allowing protective sleeve to be easily removed without permanently destroying each tie strap.

Power transmitting elongate assembly 10 in FIGS. 1 and 2 is used to protect electrical cable 16 from wear and/or physical damage. For example, electrical cable 16 may be carried by a ring 27 mounted to a manipulative robot 29 (shown in fragmentary view for purposes of simplicity). With protective sleeve 12 and cable ties 14 in place around a selected length of electrical cable 16, power transmitting elongate assembly 10 may be slid in an axial direction toward ring 27 such that ring 27 engages protective sleeve 12 rather than electrical cable 16. Wear and damage of electrical cable 16 is thereby inhibited.

Referring now to FIG. 3, there is shown another embodiment of a power transmitting elongate assembly 30 of the present invention, including a protective sleeve 32 secured by a fastener 34 to a power transmitting elongate element 36.

Protective sleeve 32 substantially forms a complete band around power transmitting elongate element 36. A plurality of through holes 38 in protective sleeve 32 are arranged in two sets, each set being aligned adjacent and parallel to one of two opposite ends 40 of protective sleeve 32. Ends 40 are disposed substantially perpendicular to the longitudinal axis 42 of elongate element 36. A pair of ties 44 are threaded through each respective set of through holes 38 in a zigzag pattern by entering each successive through hole 38 on the same side of protective sleeve 12 that the tie 44 exited the previous through hole 38. Ties 44 can be tie wraps or strings which can be tightened or loosened to adjust an inner diameter (not numbered) of protective sleeve 42 to an outside diameter of elongate element 36.

Elongate element 36 includes a fluid hose 46 for supplying fluid power (e.g., pneumatic or hydraulic power) and a plurality of electrical cables 48 for supplying electrical power. Protective sleeve 32 surrounds the group of electrical cables 48 and fluid hose 46 to prevent wear thereof. As indicated with respect to the embodiment of protective sleeve 12 in FIGS. 1 and 2, protective sleeve 32 likewise may be configured from any suitable material.

Fastener 34 is configured as a zipper having interconnecting components in the form of zipper halves (not numbered) which interconnect opposite sides 52 of protective sleeve 22. Zipper 34 is easy to open and close as compared to strap/catch combination 26, 28. However, zipper 34 is not capable of tightening protective sleeve 32 to power transmitting elongate elements 36 having a wide range of circumferences as can strap/catch combination 26, 28. With zipper 34, protective sleeve 32 must be selected to have a distance between opposite sides 52 which more closely approximates the circumference of elongate elements 36 to be covered. Finer adjustments to tightness can be made with ties 44 as described above. Zippers 34 are commonly known and a description of such is omitted herein.

During use, and referring to FIG. 3, protective sleeve 32 is applied to a particularly exposed portion of elongate element 36 to prevent wear or damage to that portion of elongate element 36. Any mechanical forces that would otherwise wear or damage elongate element 36 act instead upon protective sleeve 32. Protective sleeve 32 can also be applied to any already worn or damaged portion of elongate element 36. In this case, protective sleeve 32 prevents further wear or damage to power transmitting elongate element 36 and the associated electrical shorts and fluid leaks are thus avoided.

In the embodiments shown in FIGS. 1–2 and 3, the fasteners have been shown as a strap/catch 14 and a zipper 34. However, it is to be understood that the fastener(s) can be any kind of fastening mechanism.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In a manipulative robot, a power transmitting elongate assembly for transmitting electrical or fluid power, said elongate assembly comprising:

at least one power transmitting elongate element having a longitudinal axis, said at least one elongate element comprising one of an electrical cable and a fluid hose;

a protective sleeve of a unitary and monolithic abrasion-resistant construction wrapped completely around said at least one elongate element, said protective sleeve having a length and two opposite sides, each of said sides being disposed substantially parallel to said longitudinal axis; and at least one fastener coupling said protective sleeve to said at least one elongate element, said at least one fastener being at least one of wrapped around and attached to said protective sleeve, said at least one fastener including two interconnecting components which interconnect with each other.

2. The elongate assembly in a manipulative robot of claim 1, wherein said two interconnecting components respectively comprise a one-way catch and a strap end.

3. The elongate assembly in a manipulative robot of claim 1, wherein said at least one fastener comprises at least one tie wrap.

4. The elongate assembly in a manipulative robot of claim 1, wherein said at least one fastener comprises a zipper.

5. The elongate assembly in a manipulative robot of claim 1, wherein said protective sleeve is comprised of a material which is electrically non-conductive, non-absorbent and non-permeable.

6. The elongate assembly in a manipulative robot of claim 1, wherein said at least one elongate element comprises a plurality of elongate elements.

7. In a manipulative robot, a power transmitting elongate assembly for transmitting electrical or fluid power, said elongate assembly comprising:

at least one power transmitting elongate element having a longitudinal axis, said at least one elongate element comprising one of an electrical cable and a fluid hose;

a protective sleeve wrapped completely around said at least one elongate element, said protective sleeve having a length and two opposite sides, each of said sides being disposed substantially parallel to said longitudinal axis, said protective sleeve including opposite ends, a plurality of through holes aligned adjacent and parallel to each of said ends, and a pair of ties threaded through said plurality of through holes at each of respective said ends, said ties securing said protective sleeve to said at least one elongate element; and at least one fastener coupling said protective sleeve to said at least one elongate element, said at least one fastener being at least one of wrapped around and attached to said protective sleeve, said at least one fastener including two interconnecting components which interconnect with each other.

8. The elongate assembly in a manipulative robot of claim 7, wherein said ties define a means for adjusting said protective sleeve to an outside diameter of said at least one elongate element.

9. The elongate assembly in a manipulative robot of claim 8, wherein said ties comprise strings.

10. In a manipulative robot, a power transmitting elongate assembly for transmitting electrical or fluid power, said elongate assembly comprising;

a plurality of power transmitting elongate elements, each of said plurality of elongate elements having a longitudinal axis, said plurality of elongate elements including at least one pneumatic hose;

a protective sleeve wrapped completely around said plurality of elongate elements, said protective sleeve having a length and two opposite sides, each of said sides being disposed substantially parallel to said longitudinal axis; and at least one fastener coupling said protective sleeve to said plurality of elongate elements, said at least one fastener being at least one of wrapped around and attached to said protective sleeve, said at least one fastener including two interconnecting components which interconnect with each other.

11. In a manipulative robot, a power transmitting elongate assembly for transmitting electrical or fluid power, said elongate assembly comprising:

a plurality of power transmitting elongate elements, each of said plurality of elongate elements having a longitudinal axis, said plurality of elongate elements including at least one hydraulic hose;

a protective sleeve wrapped completely around said plurality of elongate elements, said protective sleeve having a length and two opposite sides, each of said sides being disposed substantially parallel to said longitudinal axis; and at least one fastener coupling said protective sleeve to said plurality of elongate elements, said at least one fastener being at least one of wrapped around and attached to said protective sleeve, said at least one fastener including two interconnecting components which interconnect with each other.

* * * * *

UNITED STATES PATENT AND TRADEMARK OFFICE
CERTIFICATE OF CORRECTION

PATENT NO. : 6,111,194
DATED : August 29, 2000
INVENTOR(S) : Erwin K. Kroulik

It is certified that error appears in the above-identified patent and that said Letters Patent is hereby corrected as shown below:

COLUMN 4

Line 64, delete "an electrical cable and a fluid" and substitute --pneumatic hose and hydraulic-- therefor; and Line 65, delete "and monolithic abrasion-resistant"; and Line 66, after construction insert --and comprised of an aramid fiber--.

Signed and Sealed this

Fifteenth Day of May, 2001

Attest:

NICHOLAS P. GODICI

Attesting Officer

Acting Director of the United States Patent and Trademark Office